(12) United States Patent
Kikuchi (10) Patent No.: US 10,743,074 B2
(45) Date of Patent: Aug. 11, 2020

(54) SYSTEMS AND METHODS FOR APPLYING A SHORTCUT TO A STREAMING MEDIA CHANNEL

(71) Applicant: Sony Interactive Entertainment LLC, San Mateo, CA (US)

(72) Inventor: Megumi Kikuchi, Tokyo (JP)

(73) Assignee: Sony Interactive Entertainment LLC, San Mateo, CA (US)

( * ) Notice: Subject to any disclaimer, the term of this patent is extended or adjusted under 35 U.S.C. 154(b) by 3 days.

(21) Appl. No.: 15/909,334

(22) Filed: Mar. 1, 2018

(65) Prior Publication Data

US 2018/0288488 A1 Oct. 4, 2018

Related U.S. Application Data

(60) Provisional application No. 62/479,100, filed on Mar. 30, 2017.

(51) Int. Cl.
*H04N 21/472* (2011.01)
*H04N 21/475* (2011.01)
*H04N 21/61* (2011.01)
*H04N 21/41* (2011.01)

(52) U.S. Cl.
CPC ... *H04N 21/47217* (2013.01); *H04N 21/4126* (2013.01); *H04N 21/4753* (2013.01); *H04N 21/47202* (2013.01); *H04N 21/6125* (2013.01)

(58) Field of Classification Search
None
See application file for complete search history.

(56) References Cited

U.S. PATENT DOCUMENTS

| | | | |
|---|---|---|---|
| 2011/0069940 A1* | 3/2011 | Shimy | G11B 27/105 386/296 |
| 2013/0027613 A1* | 1/2013 | Kim | H04N 21/4126 348/563 |
| 2013/0097626 A1* | 4/2013 | Rajagopal | H04N 21/2541 725/25 |
| 2017/0230712 A1* | 8/2017 | Demerchant | H04N 21/454 |

* cited by examiner

*Primary Examiner* — Nathan J Flynn
*Assistant Examiner* — Christen A Kurien
(74) *Attorney, Agent, or Firm* — Penilla IP, APC (57) ABSTRACT

A method for applying a shortcut to a streaming multimedia channel is described. The method includes receiving a request from an application of a portable device to generate an auto access identifier (ID) to a media channel that is currently being rendered on a main display. The request is associated with a user account and used by a streaming interface to facilitate rendering of the media channel. The method further includes identifying the media channel currently being rendered and user login data used to access the user account. The method includes generating control data for the auto access ID. The auto access ID is usable to instruct the streaming interface to return to the media channel at a later point in time. The method includes sending the auto access ID, by the streaming interface, to the application of the portable device.

23 Claims, 7 Drawing Sheets

FIG. 3

SYSTEMS AND METHODS FOR APPLYING A SHORTCUT TO A STREAMING MEDIA CHANNEL

CLAIM OF PRIORITY

This application claims the benefit of and priority, under 35 U.S.C. § 119(e), to U.S. Provisional Patent Application No. 62/479,100, filed on Mar. 30, 2017, and titled "Systems and Methods for Applying a Shortcut to a Streaming Media Channel", which is hereby incorporated by reference in its entirety.

FIELD

The present disclosure relates to systems and methods for applying a shortcut to a streaming media channel.

BACKGROUND

A variety of media services are accessible on a television screen. Some examples of the media services include Netflix™ media service, Amazon Prime™ media service, and Playstation Vue™ media service, etc. Without subscribing to a cable television network or a satellite television network, users can access the media services with the same speed as that of the cable television network and in a much cost-effective manner.

However, in providing the media services to the television screen, a large number of back and forth communication has to occur between a user and devices involved in providing the media services.

SUMMARY

Embodiments of the present disclosure provide systems and methods for applying a shortcut to a streaming media channel.

Other aspects of the present disclosure will become apparent from the following detailed description, taken in conjunction with the accompanying drawings, illustrating by way of example the principles of embodiments described in the present disclosure.

In one embodiment, a user is watching a golf channel, which is accessed via a streaming TV service or a streaming TV application. The streaming TV service is accessed via a game console. The user selects "create a shortcut" button on his/her smartphone. The game console obtains information, such as who is logged in currently, what streaming TV service or streaming TV application is running, and obtains a status, e.g., watching the golf channel from the streaming TV service. Based on the information, the game console creates a plurality of sequential steps, which include turning on the game console, logging in by the user, turning on the streaming TV service, and selecting the golf channel. After the creation of the sequential steps, the game console sends a shortcut icon graphic and an identifier associated with the sequential steps to the user's smartphone. When the user selects a shortcut icon on the smartphone, the smartphone sends the identifier to the game console and the game console executes the sequential steps to display the golf channel to the user without any input associated with the waiting to the game console.

The game console is used to access one or more streaming television (TV) channels. For example, a user operates a hand-held controller to select one of the streaming TV channels. The hand-held controller sends a signal to the game console, which then accesses multimedia associated with the selected streaming TV channel. However, to access the streaming TV channel, the game console waits to receive sign-in information from the hand-held controller. Upon receiving the sign-in information, the game console further waits to receive a selection of a streaming TV service from the hand-held controller. Moreover, upon receiving the selection of the streaming TV service, the game console waits to receive a selection of one of multiple streaming TV channels from the hand-held controller. As such, the amount of waiting time results in delays in displaying the streaming TV channel on a main display device, such as a television. This results in the user being frustrated in watching his/her favorite TV show. There are too many hoops that the user has to undergo to receive the streaming TV channel. Also, a processor of the game console may enter into a looped waiting mode each time it expects to receive a signal indicating the sign-in information, or the selection of the streaming TV service, or the selection of the streaming TV channel from the hand-held controller. The loop waiting mode is an impediment to the processor in that the processor can use the time associating with the loop waiting mode to perform other operations.

In one embodiment, an auto access identifier is created to identify a sequence of processes, e.g., operations. The creation of the auto access identifier can occur, in one embodiment, by selection of a create shortcut button on the smartphone, while the user is watching the streaming TV channel. The auto access identifier is created by the game console and sent to the smartphone for storing in the smartphone. The auto access identifier is used by the game console to execute the sequence of processes, such as, sending the sign-in information to a server system providing the streaming TV service for validation of a user account used to access the streaming TV service, sending an identifier of the streaming TV service to the server system, and sending an identifier of the streaming TV channel to the server system. Once the auto access identifier is received by the game console from the smartphone, there is no need for the game console to wait to receive the sign-in information from the user, the selection of the streaming TV service from the user, and the selection of the streaming TV channel from the user. As such, inefficiencies associated with receiving the sign-in information from the user, receiving the selection of the streaming TV service from the user, and receiving the selection of the streaming TV channel from the user are removed.

In one aspect, a method for applying a shortcut to a streaming multimedia channel is described. The method includes receiving, by a streaming interface, a request from an application of a portable device to generate an auto access identifier (ID) to a media channel that is currently being rendered on a main display. The request is associated with a user account and used by the streaming interface to facilitate rendering of the media channel. The media channel is one of a plurality of media channels provided by a streaming multimedia service. The method further includes identifying, by the streaming interface, the media channel currently being rendered and user login data used to access the user account upon receiving the request. The method includes generating, by the streaming interface, control data for the auto access ID. The auto access ID is usable to instruct the streaming interface to return to the media channel at a later point in time. The method includes sending the auto access ID, by the streaming interface, to the application of the portable device. The auto access ID is used to access the user account to enable automatic launching of the streaming interface back to the media channel when an auto launch is received for the media channel via an icon associated with the auto access ID.

In another aspect, a method for applying a shortcut to a streaming media channel is described. The method includes receiving, by a streaming multimedia service, user login data of a user account from the portable device. The method further includes receiving, by the streaming multimedia service, a selection of a multimedia application from the portable device via the user account. The method includes providing, by the streaming multimedia service, access to a plurality of streaming multimedia channels via the user account upon determining that the user login data is authentic and upon receiving the selection of the multimedia application. The method includes receiving, by a streaming interface, via the user account a selection indicating that a shortcut to one of the streaming multimedia channels is to be created. The method includes creating, by the streaming interface, the shortcut upon receiving the selection and receiving, by the streaming interface, a selection of the shortcut. The method includes enabling, by the streaming multimedia service, access to the streaming multimedia channel upon receiving the selection of the shortcut.

In an aspect, a system for applying a shortcut to a streaming media channel is described. The system includes a streaming interface configured to connect to a computer network to access a streaming multimedia service. The system further includes a portable device coupled to the streaming interface. The system includes a server coupled to the streaming interface via the computer network. The server is configured to execute the streaming multimedia service to receive user login data of a user account from the portable device and to receive a selection of a multimedia application via the user account from the portable device. The server is further configured to execute the streaming multimedia service to provide access to a plurality of streaming multimedia channels via the user account upon determining that the user login data is authentic and upon receiving the selection of the multimedia application. The streaming interface is configured to receive via the user account a selection indicating that a shortcut to one of the streaming multimedia channels is to be created. Moreover, the streaming interface is configured to receive a selection of the shortcut. The streaming interface is configured to enable access to the one of the streaming channels upon receiving the selection of the shortcut.

BRIEF DESCRIPTION OF THE DRAWINGS

Various embodiments of the present disclosure are best understood by reference to the following description taken in conjunction with the accompanying drawings in which:

FIG. 2A-1 is a diagram to illustrate a selection of a create shortcut button on a display device.

FIG. 2A-2 is a diagram of a system to illustrate a creation of an auto access identifier of a plurality of processes that are to be executed when a shortcut button is selected by a user via a user account.

FIG. 2A-3 is a diagram of an embodiment of a smartphone to illustrate a shortcut that is displayed on a display screen of the smartphone.

DETAILED DESCRIPTION

Systems and methods for applying a shortcut to a streaming media channel are described. It should be noted that various embodiments of the present disclosure are practiced without some or all of these specific details. In other instances, well known process operations have not been described in detail in order not to unnecessarily obscure various embodiments of the present disclosure.

Figure 1A:
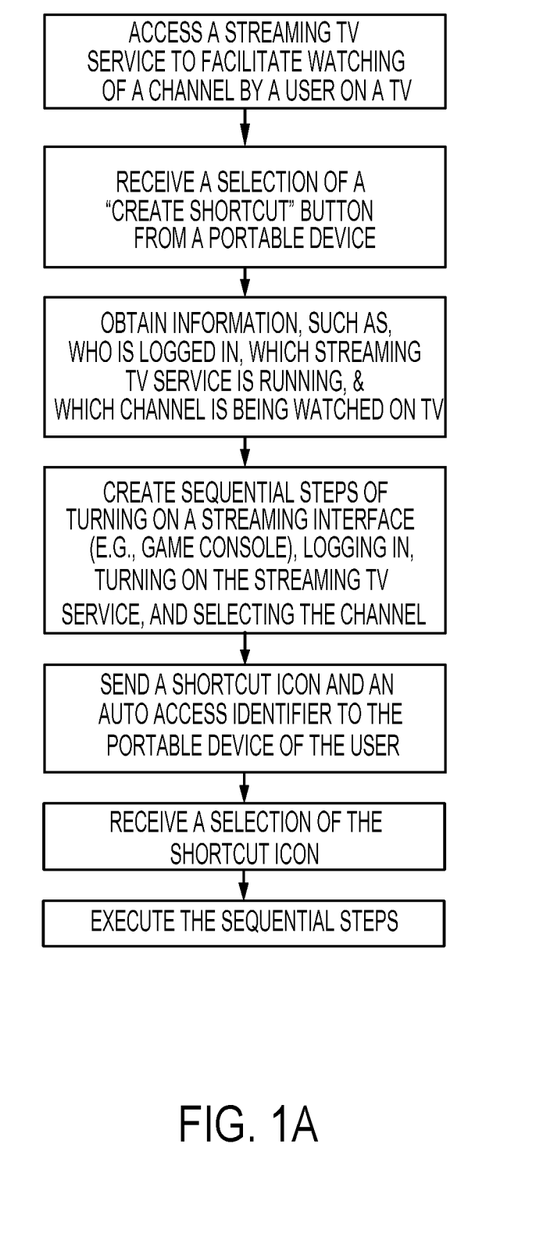
FIG. 1A is a flowchart of an embodiment of a method for creating and using a shortcut to a streaming television (TV) service.

FIG. 1A is a flowchart of an embodiment of a method for creating and using a shortcut to a streaming TV service. Broadly speaking, in one embodiment, a user is watching a golf channel, which is accessed via the streaming TV service or a streaming TV application. The streaming TV service is accessed via a game console. The user selects "create a shortcut" button on his/her smartphone. The game console obtains information, such as who is logged in currently, what streaming TV service or streaming TV application is running, and obtains a status, e.g., watching the golf channel from the streaming TV service. Based on the information, the game console creates a plurality of sequential steps, which include turning on the game console, logging in by the user, turning on the streaming TV service, and selecting the golf channel. After the creation of the sequential steps, the game console sends a shortcut icon and an auto access identifier associated with the sequential steps to the user's smartphone. When the user selects the shortcut icon on the smartphone, the smartphone sends the auto access identifier to the game console and the game console executes the sequential steps to display the golf channel to the user without any input from the user to the game console.

Figure 1B:
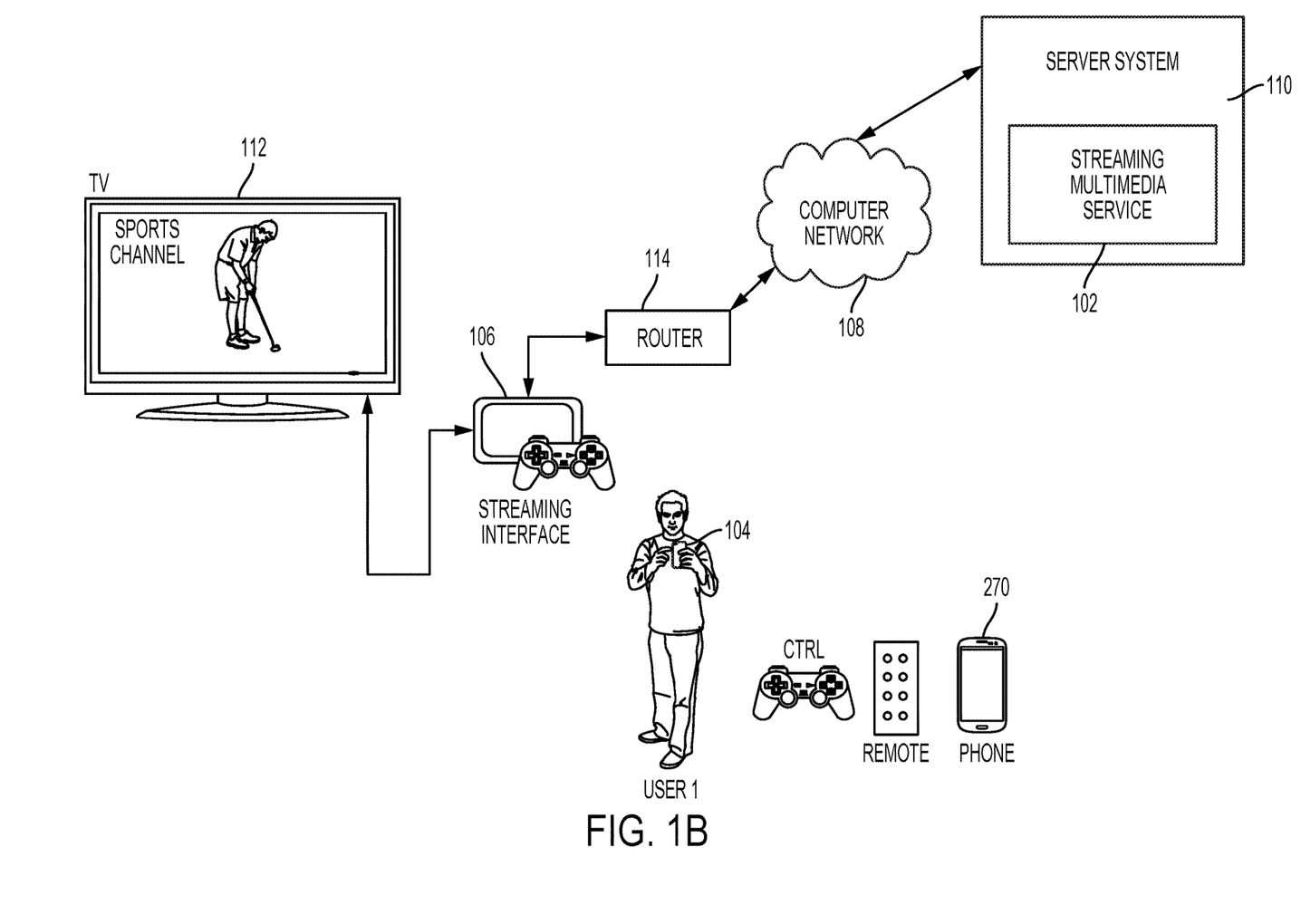
FIG. 1B is diagram of an embodiment of a system to illustrate receiving of multimedia that is streamed from a server.

FIG. 1B is diagram of an embodiment of a system 100 to illustrate receiving of multimedia that is streamed from a server. The system 100 includes a portable device 104, a streaming interface 106, a computer network 108, a server system 110, a display device 112, and a router 114. A smartphone 270 is an example of the portable device 104.

A portable device, as used herein, is one or more devices that enable the communication of selections made by a user 1 on the portable device to the streaming interface 106 or to the computer network 108. For example, the portable device communicates via a wired connection, such as a cable, or a wireless connection, such as an infrared communication link, a Bluetooth™ connection, or a Wi-Fi connection, to the streaming interface 106. As another example, the portable device includes a communication device that communicates via a wired protocol or a wireless protocol, such as Bluetooth™ or Wi-Fi, with the streaming interface 106. Examples of a portable device include a hand-held controller used to play a game, a remote controller, a desktop computer, a laptop computer, a tablet, a mobile phone, and the smartphone 270. In one embodiment, a portable device connects to the computer network 108 or connects to the router 114 via a wireless protocol, such as Wi-Fi, which is connected to the computer network 108. It should be noted that when the portable device 104 is a smartphone or a tablet or a laptop computer, the portable device 104 includes an external communication device that applies an external communication protocol to transfer data via the computer network 112 or via the router 114 and the computer network 112 to the server system 110. Examples of external communication protocol include a Transmission Control Protocol (TCP) over Internet protocol (IP), Universal Datagram Protocol (UDP) over IP, and a customized communication protocol.

A streaming interface, as used herein, is a device that is connected via a wired connection, such as a cable, a High-Definition Multimedia Interface (HDMI) cable, or a Universal Serial Bus (USB) cable, to the display device 112. For example, the streaming interface is an HDMI stick that connects to an HDMI connector of a television or a USB stick that connects to a USB port of the television. As another example, the streaming interface is a game console, such as a Playstation™, that connects via a cable to a television. As yet another example, the streaming interface is a streaming multimedia player that decodes encoded data that is received from a streaming multimedia service. As another example, the streaming interface includes a memory device that stores one or more passwords that allow access to a streaming multimedia service.

The display device 112, as used herein, includes one or more display screens used to display images of videos, which are accessed via the computer network 108 from the streaming multimedia service 102. Examples of the display device 112 include a liquid crystal display (LCD) device, a light emitting diode (LED) display device, an organic LED (OLED), and a plasma display device. Further examples of the display device 112 include a television and a smart television. The display device 112 is an example of a main display, as used herein.

A router, as used herein, enables coupling of a streaming interface and/or the smartphone 270 to the computer network 108. For example, the router is a networking device that communicates data packets to and from the computer network 108. To illustrate, the router routes packets that is received from a streaming interface or from the smartphone 270 or from a computer network to a destination that is indicated within the packets.

A computer network, as used herein, is a local area network (LAN) such as an intranet, or is a wide area network (WAN) such as the Internet, or a combination thereof. The computer network applies a communication protocol, such as a Transmission Control Protocol over an Internet Protocol (TCP/IP), to transfer data between a streaming multimedia service and a router or between the streaming multimedia service and the smartphone 270 or between the streaming multimedia service and a display device.

A server system, as used herein, includes one or more servers that are coupled to each other. Each server is a computer or a virtual machine that provides functionality of a streaming multimedia service to the smartphone 270, or a streaming interface, or a display device, or a combination thereof. In the virtual machine, a hypervisor is a computer software or hardware or a combination thereof that shares and manages hardware resources, such as processors and memory devices, to run the streaming multimedia service 102. As an example, a virtual machine includes an operating system, one or more application computer programs that run on top of the operating system, and one or more hardware resources, such as central processing units (CPUs), graphical processing units (GPUs), video encoders, audio encoders, network communication devices, memory devices, and network communication devices, that are accessed by the one or more application computer programs via the operating system and the hypervisor for performing the functions described herein as being performed by a server. As another example, a server includes one or more processors that are coupled to one or more memory devices for performing the functions described herein. Examples of a processor include a CPU, an application specific integrated circuit (ASIC), and a programmable logic device (PLD). Examples of a memory device include a read-only memory (ROM) device, or a random access memory (RAM) device, or a combination thereof. To illustrate, a memory device includes a flash memory or a redundant array of independent disks (RAID).

A streaming multimedia service, as used herein, is a subscription service that is purchased by the user 1 to enable streaming of multimedia content, such as audio and video data. For example, the user 1 makes a periodic payment to the streaming multimedia service to obtain access to the multimedia content. In this example, without confirming receipt of the periodic payment, the server system 110 does not allow access to the multimedia content to the user 1 via a user account 1 that is assigned to the user 1 by the server system 110. The multimedia content, when accessed, by a client device, such as the smartphone 270 or the display device 112, is constantly received by and displayed on the client device. In one embodiment, streaming is distinguished from downloading in that during the downloading process, the client device obtains an entire file having the multimedia content before the multimedia content is displayed on the client device. An example of the streaming multimedia service is a streaming television service that allows access to television network channels to display the multimedia content, such as, sports, news, finances, live television shows, and music.

The portable device 104 is coupled to the streaming interface 106 via a wired connection or a wireless connection. Examples of the wired connection include a cable that transfers data using a serial transfer, or a parallel transfer, or universal serial bus (USB) transfer. Examples of the wireless connection include a Bluetooth™ link or a Wi-Fi link or a customized wireless protocol link.

The streaming interface 106 is coupled to the router 114 via an internal wired communication link or an internal wireless communication link. Examples of the internal wired communication link include a cable that transfers data using a serial transfer, or a parallel transfer, or universal serial bus (USB) transfer. Examples of the internal wireless communication link include a Wi-Fi protocol link or a Bluetooth™ link or a customized wireless protocol link.

The streaming interface 106 and the server system 110 communicate with each other via the router 114 and the computer network 108 using the external communication protocol. For example, the server system 110 includes a CPU that obtains image data from a camera recording a show to create the multimedia content, and renders the image data, in real time, to generate a plurality of video frames. The server system 110 further includes one or more encoders that encode, such as compress, in real time, the video frames to generate encoded video frames. A communication device of the server system 110 applies the external communication protocol, in real-time, to the encoded video frames to generate packets, and sends the packets via the computer network 108 to the router 114, which directs the packets to the streaming interface 106. The rendering, the video encoding, and the packetization are performed before a pre-determined delay, such as instantaneously or in real time, to broadcast the live event via the streaming multimedia service 102. It should be noted that the camera captures the image data from a live event, such as a National Basketball Association (NBA) championship or a tennis tournament or a golf tournament or a chess tournament or a live television show. In one embodiment, the rendering, the encoding, and the packetization are performed after the pre-determined delay, e.g., not in real time. For example, the image data is stored in a memory device of the server system 110 for later access by the CPU of the server system 110.

The user 1 operates the portable device 104 to access a streaming media channel, such as a sports channel, or a network channel, or a shopping channel or a wrestling channel, on the display device 112. For example, the user 1 selects one or more buttons on the portable device 104 to turn on the display device 112. Moreover, the user 1 selects one or more buttons on the portable device 104 to activate the streaming interface 106. For example, when the streaming interface 106 is sleeping, an indication of a selection of a button on the portable device 104 is transferred via the wired or wireless connection to the streaming interface 106 to wake up the streaming interface 106. Upon receiving the indication, the streaming interface 106 is ready to accept instructions from the portable device 104.

The user 1, when not signed into the user account 1 to access via streaming multimedia service 102 various streaming multimedia services and/or to games, selects one or more buttons on the portable device 104 to provide user information to the streaming multimedia service 102. Examples of the user information included an e-mail address assigned to the user, or a username, or a password assigned to the user, or a combination thereof. In one embodiment, the terms user login data, login data, and user information are used interchangeably herein. The user information is assigned to the user 1 by an authentication server of the server system 110 and is unique to the user 1. For example, the user 1 provides the user information to register with the authentication server of the server system 110 to create the user account 1. The user account 1 is stored on the server system 110. As another example, the authentication server determines whether the user information is assigned to a user other than the user 1. Upon determining that the user information is assigned to the other user, the authentication server indicates to the user 1 via the computer network 108, the router 114, the streaming interface 106, and the display device 112 that the user information is assigned to the other user. In this case, the user 1 changes the user information by using the portable device 104 and provides the changed user information to the authentication server via the streaming interface 106, the router 114, and the computer network 108.

The user information is transferred from the portable device 104 to the streaming interface 106 via the wired or wireless connection. The streaming interface 106 via the internal wired or the internal wireless communication link sends the user information to the router 114. The router 114 routes the user information via the computer network 108 to the authentication server of the server system 110. The authentication server compares the user information with user information that is stored in a memory device of the server system 110 and upon determining that there is a match between the received user information and the stored user information, the authentication server allows access to the user account 1 to further access the streaming multimedia service 102.

When the access to the user account 1 is allowed, packets including encoded video frames, which include user interface data identifying a plurality of streaming multimedia channels of the streaming multimedia service 102, are sent from the server system 110 via the computer network 108 and the router 114 to the streaming interface 106. A communication device of the streaming interface 106 applies the external communication protocol to the packets to extract the encoded video frames having the data identifying the streaming multimedia channels of the streaming multimedia service 102. Moreover, the streaming interface 106 decodes the encoded video frames to output video frames having the data identifying the streaming multimedia channels. The video frames output from the streaming interface 102 are sent via the wired connection to the display device 112 to display identifications of the streaming multimedia channels.

The user 1 selects one or more buttons on the portable device 104 to select one of the identifications of one of the streaming multimedia channels to the streaming interface 106. An indication of the selection of the identification of the streaming multimedia channel is sent from the portable device 104 via the wired or wireless connection, the streaming interface 106, the router 114, and the computer network 108 to the streaming multimedia service 102 of the server system 110. The CPU of the server system 110 identifies video frames to be sent to the streaming interface 106 based on the identification of the streaming multimedia channel.

Packets including encoded video frames of the streaming multimedia channel are sent from the server system 110 via the computer network 108 and the router 114 to the streaming interface 106. The communication device of the streaming interface 106 extracts the encoded video frames from the packets and decodes the encoded video frames to output video frames of the streaming multimedia channel. The video frames output from the streaming interface 102 are sent via the wired connection to the display device 112 to display the streaming multimedia channel.

Again, in one embodiment, a user is watching a golf channel, which is accessed via the streaming multimedia service 102 or a streaming TV application. The streaming multimedia service 102 is accessed via the game console. The user selects "create a shortcut" button on the smartphone 270. The game console obtains information, such as who is logged in currently, what streaming multimedia service 102 or streaming TV application is running, and obtains a status, e.g., watching the golf channel from the streaming multimedia service 102. Based on the information, the game console creates a plurality of sequential steps, which include turning on the game console, logging in by the user, turning on the streaming multimedia service 102, and selecting the golf channel After the creation of the sequential steps, the game console sends a shortcut icon and an auto access identifier associated with the sequential steps to the user's smartphone 270. When the user selects the shortcut icon on the smartphone 270, the smartphone 270 sends the auto access identifier to the game console and the game console executes the sequential steps to display the golf channel to the user without any input associated with the waiting to the game console.

Figure 2A:
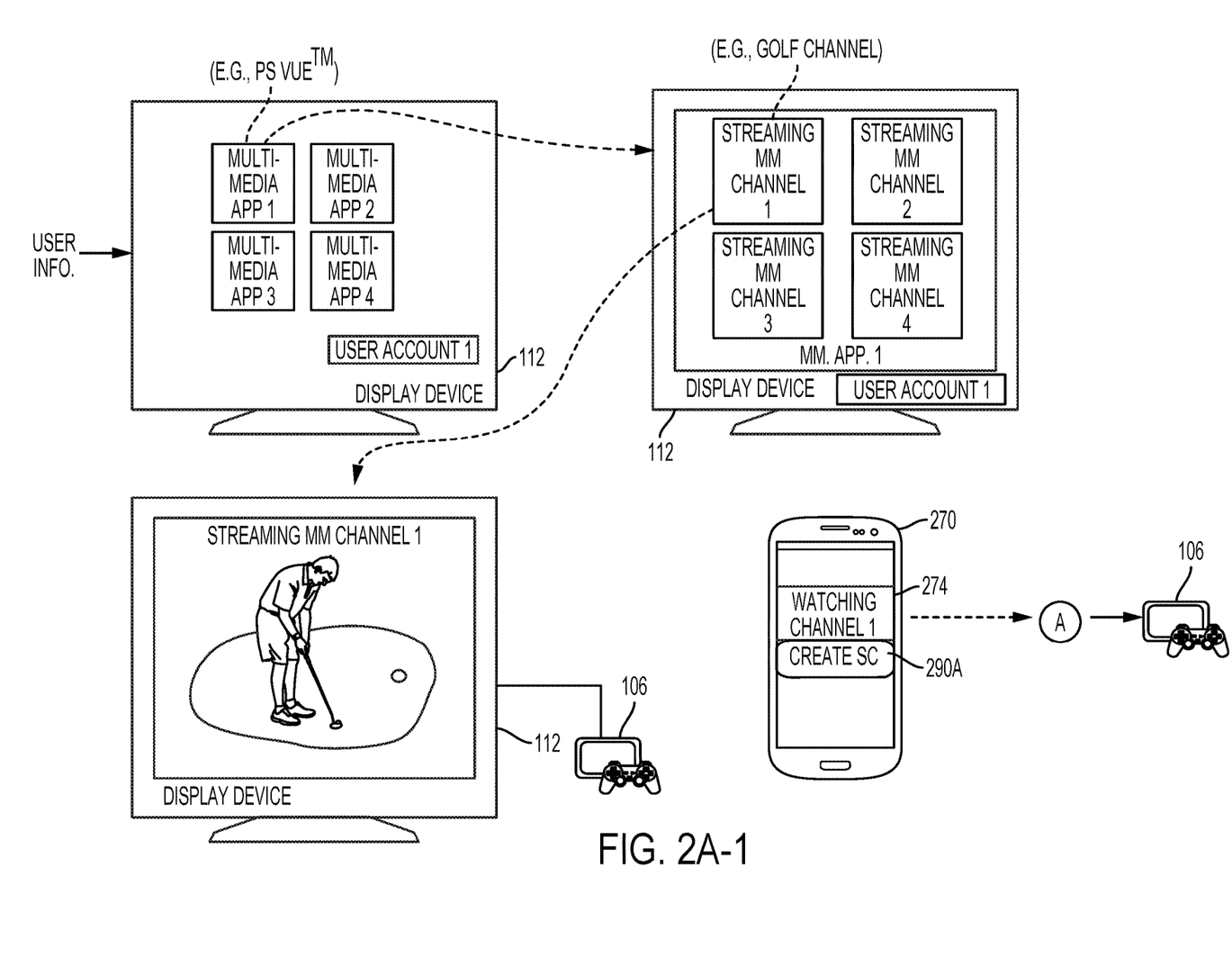

FIG. 2A-1 is a diagram to illustrate generation of a create short button on the display device 112. Identifications of streaming multimedia services, e.g., identifiers of multimedia applications that allow access to different streaming multimedia services, are displayed on the display device 112 when the user 1 is allowed access to the user account 1. For example, the display device 112 displays a multimedia application identifier 1, e.g., Playstation VUE™, which is a name describing the streaming multimedia service 102. Similarly, the display device 112 displays a multimedia application identifier 2, e.g., Netflix™, which is a name describing another streaming multimedia service. Moreover, the display device 112 displays a multimedia application identifier 3, e.g., Amazon Prime™ which is a name describing yet another streaming multimedia service. Also, the display device 112 displays a multimedia application identifier 4, which is a name describing another streaming multimedia service. Moreover, the display device 112 displays an identification, such as the user information, of the user account 1 used to access the streaming multimedia service 102 and the different streaming multimedia services identified by the multimedia application identifiers 2 through 4.

The user 1 selects one or more buttons on the portable device 104, e.g., the hand-held controller, of FIG. 1B to select the multimedia application identifier 1. An indication of the selection of the one or more buttons selecting the multimedia application identifier 1 is sent from the portable device 104 via the streaming interface 106, the router 114 and the computer network 108 to the server system 110. In response to receiving the indication of the selection of the multimedia application identifier 1, the server system 110 sends identifications, such as identifiers, short descriptions, or names, of multiple streaming multimedia channels 1 through 4 that the user account 1 has subscription to. The identifications of the streaming multimedia channels 1 through 4 are sent from the server system 110 via the computer network 108, the router 114, and the streaming interface 106 to the display device 112 for display. For example, the display device 112 displays a streaming multimedia channel identifier 1, which identifies a streaming multimedia channel 1, e.g., a golf channel. Similarly, the display device 112 displays a streaming multimedia channel identifier 2, which identifies a streaming multimedia channel 2, e.g., Disney™ channel. Also, the display device 112 displays a streaming multimedia channel identifier 3, which identifies a streaming multimedia channel 3, e.g., ABC™ channel. The display device 112 displays a streaming multimedia channel identifier 4, which identifies a streaming multimedia channel 4. In addition, the display device 112 continues to display an identification of the user account 1, such as the user information, with the display of the identifications of the streaming multimedia channels 1 through 4. In one embodiment, the user account 1 is not displayed with the display of the identifications of the streaming multimedia channels 1 through 4.

The user 1 selects one or more buttons on the portable device 104, such as the hand-held controller, to select the streaming multimedia channel identifier 1. An indication of the selection of the streaming multimedia channel identifier 1 is sent from the portable device 104, the streaming interface 106, the router 114, and the computer network 108 to the server system 110. Upon receiving the indication of the selection of the streaming multimedia channel identifier 1, the server system 110 sends the video frames of the multimedia content of the streaming interface 106 for display on the display device 112.

When the user 1 is watching the streaming multimedia channel 1 on the display device 112, the user 1 logs into the user account 1 on the smartphone 270. When the user 1 is logged into the user account 1, a create shortcut button 290A is displayed on a display device 274 of the smartphone 270. The create shortcut button 290A is displayed with, such as adjacent to, or within a pre-determined distance from, or embedded within, an indication on the display device 274. The indication represents that the streaming multimedia channel 1 is being displayed on the display device 112. An example of the indication on the display device 274 includes "Watching Channel 1". The create shortcut button 290A is created by a multimedia application identified by the multimedia application identifier 1 and displayed within the multimedia application.

It should be noted that the user information received by the smartphone 270 is authenticated by the server system 110 to allow the user 1 to login to the user account 1 on the smartphone 270 before the create shortcut button 290A is displayed on the smartphone 270. For example, the user 1 provides the user information via a touchscreen to the smartphone 270. The smartphone 270 sends the user information via the computer network 108 or via the router 114 and the computer network 108 to the authentication server of the server system 110. The authentication server authenticates the user information received from the smartphone 270, such as by determining that the received user information matches the user information stored within the server system 110. Upon determining that the user information is authentic, the server system 110 provides access to the user account 1 and to the multimedia streaming service 102 via the computer network 108 or via the computer network 108 and the router 114 to the smartphone 270.

The user 1 selects the create shortcut button 290A on the display screen 274. An indication of the selection of the create shortcut button 290A is sent from the smartphone 270 via the wired or wireless connection to the streaming interface 106. For example, the smartphone 270 includes an internal communication device that applies a wireless internal communication protocol, for example, the Bluetooth™ protocol or Wi-Fi, to generate transfer units that are transferred via the wireless connection to the streaming interface 106.

In one embodiment, the indication of the selection of the create shortcut button 290A is an example of a request from the multimedia application having the multimedia application identifier 1 to generate an auto access ID1, which is further described below.

FIG. 2A-2 is a diagram of a system 240 to illustrate a creation of the auto access ID1 of a plurality of processes that are to be executed when a shortcut button is selected by the user 1 via the user account 1. The system 240 includes the streaming interface 106, the server system 110, and the smartphone 270. The streaming interface 106 includes a processor 242, an external communication device 244, an internal communication device 290, and a memory device 243. As used herein, a processor is a central processing unit, an application specific integrated circuit (ASIC), or a programmable logic device (PLD). Moreover, a communication device, as used herein, is a processor or a circuit or an ASIC or a PLD. An example of the internal communication device 290 is a device that transfers data using the Bluetooth™ protocol or Wi-Fi or a custom wireless communication protocol.

Figure 2A:
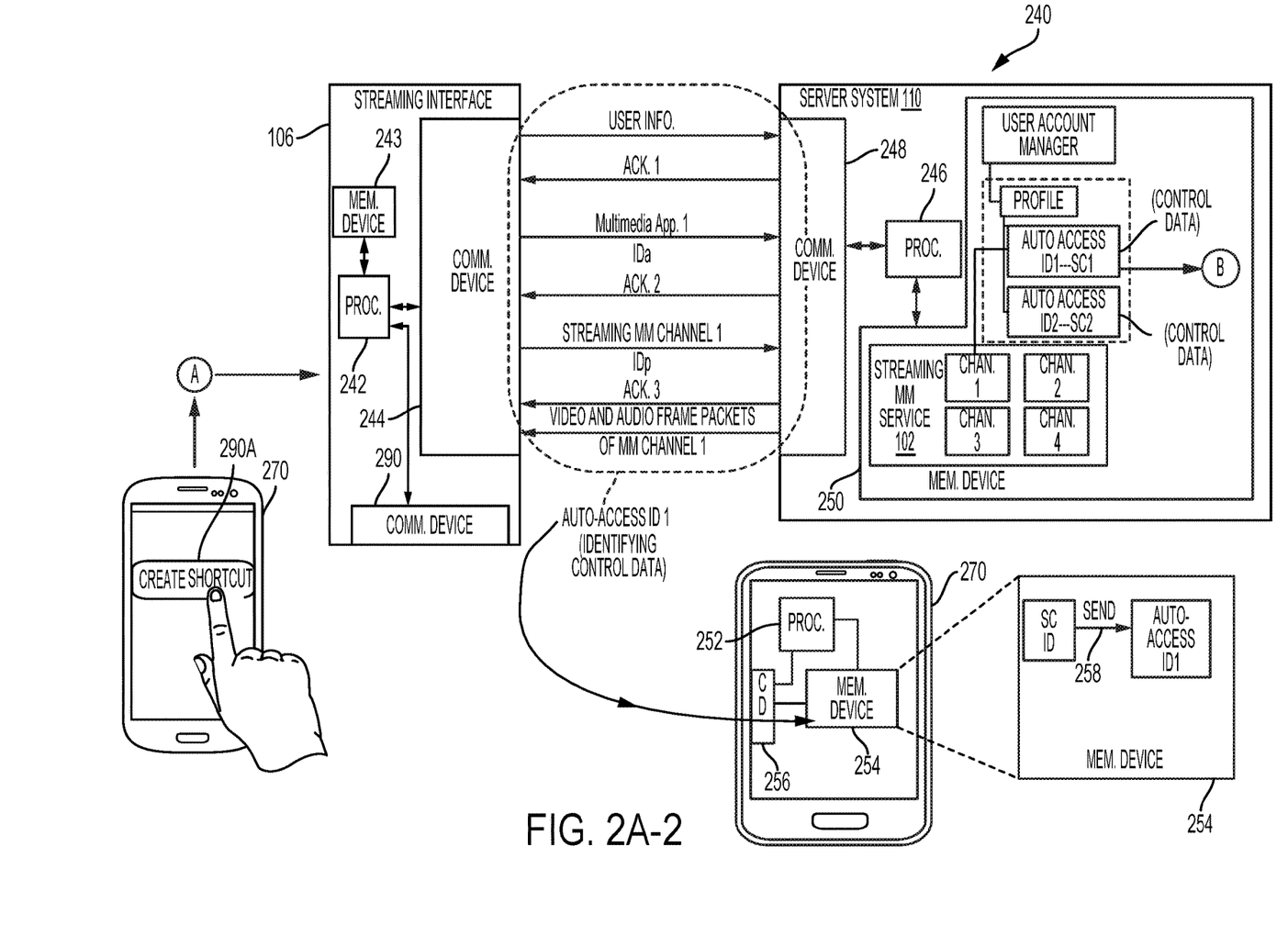
Figure 2A:
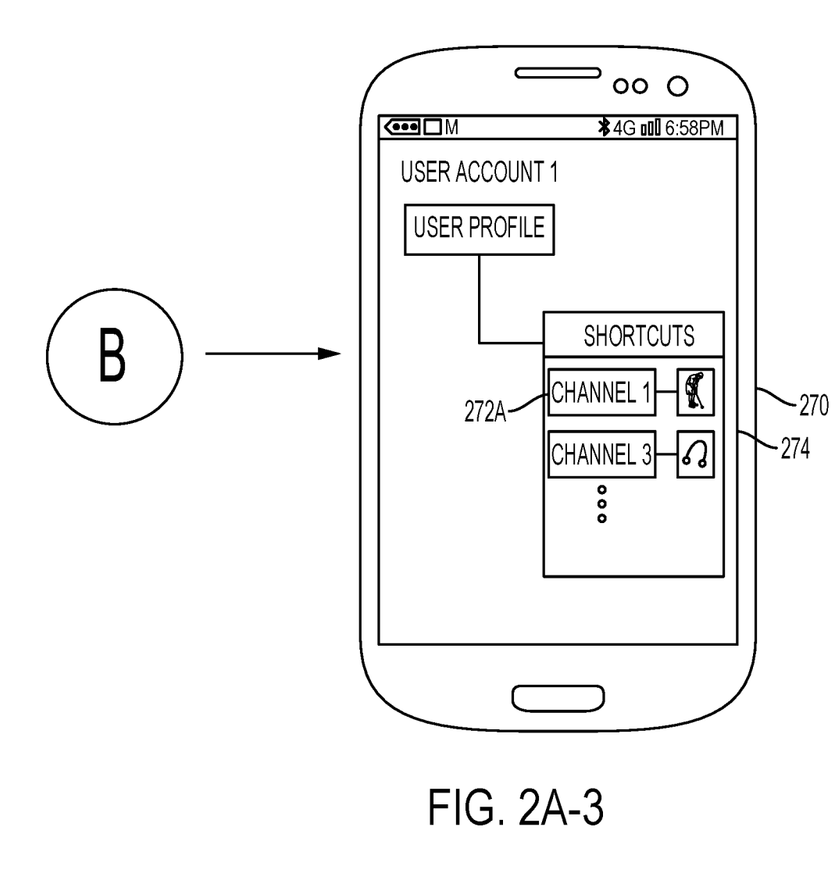

Furthermore, the server system 110 includes a processor 246 and an external communication device 248. In addition, the server system 110 includes a memory device 250. Also, the smartphone 270 includes a processor 252, a memory device 254, and an internal communication device 256. An example of the internal communication device 256 is a device that transfers data using the Bluetooth™ protocol or Wi-Fi. A processor of a device or a system, such as the streaming interface 106 or the server system 110 or the smartphone 270, is coupled to a memory device and a communication device of the device or the system via a communication bus.

The processor 252 of the smartphone 270 sends the transfer units that indicate the selection of the create shortcut button 290A via the internal communication device 256 and the wired or wireless connection to the internal communication device 290. Upon receiving the transfer units that indicate the selection of the create shortcut button 290A, the internal communication device 290 provides the indication of the selection of the create shortcut button 290A to the processor 242. In response to receiving the transfer units that indicate the selection of the create shortcut button 290A, the processor 242 creates a series of processes, such as control data. The series of processes includes a sequence, such as an order, in which the processes are to be executed and/or includes a schedule in which each of the processes is to be executed. For example, the series of processes includes that the user information, such as the email addresses of the user 1, the password of the user 1, or a combination thereof, be sent from the external communication device 244 via the router 114 and the computer network 108 to the external communication device 248 of the server system 110.

In one embodiment, the user information that is sent from the external communication device 244 to the external communication device 248 is encrypted by the processor 242 or by an encrypter, e.g., an integrated circuit, of the streaming interface 106 and sent to the external communication device 244. The user information is then packetized using the external communication protocol, and sent from the external communication device 244 via the computer network 108 to the external communication device 248 of the server system 110.

Referring back to the example illustrating the series of processes, upon receiving the user information, the processor 246 sends via the external communication device 248 an acknowledgment 1 (Ack1) of receipt of the user information to the external communication device 244. The external communication device 244, in one embodiment, is scheduled by the processor 242 to wait for the acknowledgment 1. For example, the external communication device 244 does not send an indication of a selection of the multimedia application identifier 1, illustrated in FIG. 2A-1, until the acknowledgment 1 of the receipt of the user information is received. The acknowledgment 1 is sent when the processor 246 determines that the user information is authentic, e.g., matches the stored user information within the memory device 250. In the embodiment in which the user information is encrypted, the processor 246 or a decryptor, e.g., an integrated circuit, of the server system 110 decrypts the encrypted user information.

Continuing further with the series of processes, upon receiving the acknowledgment 1 via the external communication device 244, the processor 242 determines to send the multimedia application identifier 1, e.g., an identification IDa, to the server system 110. The multimedia application identifier 1 is packetized by the external communication device 244 and sent from the external communication device 244 to the external communication device 248 via the router 114 and the computer network 108. In one embodiment, there is no need for the processor 242 to receive the acknowledgment 1 before sending the multimedia application identifier 1 to the server system 110. In this embodiment, the multimedia application identifier 1 is sent after sending the user information without waiting for the acknowledgment Ack1. In an embodiment, the identification IDa is encrypted by the streaming interface 106 in the same manner in which the user information is encrypted before being sent by the external communication device 244. An example of an identification or an identifier or an ID, as used herein, is a series of alphanumeric characters or text symbols or graphical symbols or a combination thereof. To illustrate, an identifier is a name or a description. As another illustration, an ID is a series of letters or numbers or a combination thereof.

Referring back to the example illustrating the series of processes, upon receiving the multimedia application identifier 1, the processor 246 sends via the external communication device 248 an acknowledgment 2 (Ack2) of receipt of the identifier IDa to the external communication device 244. The acknowledgment 2 is sent when the processor 246 determines that the identification IDa is accurate, e.g., matches a stored identification of the multimedia streaming service 102 within the memory device 250. The external communication device 244, in one embodiment, is scheduled by the processor 242 to wait for the acknowledgment 2. For example, the external communication device 244 does not send the streaming multimedia channel identifier 1, e.g., an identification IDp, of the streaming multimedia channel 1 until the acknowledgment 2 of the receipt of the identification IDa is received. The acknowledgment 2 is received when the processor 246 determines that the identification IDa is authentic, e.g., matches a stored ID within the memory device 250.

Moreover, in the series of processes, upon receiving the acknowledgment 2 via the external communication device 244, the processor 242 determines to send the streaming the identification IDp of the streaming multimedia channel 1. The streaming multimedia channel identifier 1 is packetized by the external communication device 244 and sent to the external communication device 248 via the router 114 and the computer network 108 to the streaming interface 106. In one embodiment, there is no need for the processor 242 to receive the acknowledgment 2 before sending the identification IDp of the streaming multimedia channel 1 to the server system 110. In this embodiment, the identification IDp is sent to the server system 110 after sending the identification IDa to the server system 110 without receiving the acknowledgment 2. In an embodiment, the identification IDp of the streaming multimedia channel 1 is encrypted by the streaming interface 106 in the same manner in which the user information is encrypted before being sent by the external communication device 244 to the server system 110.

Continuing further with the example illustrating the series of processes, upon receiving the identification IDp of the streaming multimedia channel 1, the processor 246 sends via the external communication device 248 an acknowledgment 3 (Ack3) of receipt of the identification IDp to the external communication device 244. The acknowledgment 3 is sent when the processor 246 determines that the identification IDp of the streaming multimedia channel 1 is accurate, e.g., matches a stored identification of the multimedia streaming channel 1 within the memory device 250.

In addition to sending, such as simultaneous with sending or after sending, the acknowledgment 3, the video frames of the multimedia content of the streaming multimedia channel 1 are encoded by the video encoder of the server system 110. For example, the video frames are of the golf channel that is currently being broadcasted to multiple user accounts. To illustrate, the user 1 selects the create shortcut button 290A at a time the user 1 is watching Tiger Woods play golf on the golf channel. When the video frames are sent to execute the processes, instead of Tiger Woods, Jack Nicklaus is playing golf on the golf channel and the video frames are to be displayed to show Jack Nicklaus playing golf. As another example, the video frames are of a segment of the golf channel and the video frames are customized for the user account 1. To illustrate, the user 1 selects the create shortcut button 290A at a time the user 1 is watching Tiger Woods make a golf swing on Mar. 16, 2017 at 3 pm on the golf channel. When the video frames are sent to execute the processes, Tiger Woods continues to make the golf swing that he previously made on Mar. 16, 2017 at 3 pm on the golf channel.

The encoded video frames are packetized by the external communication device 248 by applying the external communication protocol to generate the packets and sent from the server system 110 via the computer network 108 to the router 114. The router 114 determines from the packets that the packets are to be sent to the streaming interface 106. The external communication device 244 of the streaming interface 106 applies the external communication protocol to the packets to extract the encoded video frames. Moreover, the streaming interface 106 decodes the encoded video frames to output video frames. The video frames output from the streaming interface 102 are sent via the wired connection to the display device 112 to display the streaming multimedia channel 1.

The series of processes are not executed at a time the create shortcut button 290A is selected. At the time the create shortcut button 290A is selected, the processor 242 generates the auto access ID1 and associates the auto access ID1 with an execution of the series of processes, described above. For example, the processor 242 creates a link, e.g., a one-to-one relationship or a mapping, between the series of processes and the auto access ID1. To illustrate, the processor 242 creates a pointer from a memory region, e.g., a memory cell, of the memory device 243 that stores the auto access ID1 to a memory region of the memory device 243 that stores the control data.

In addition, the processor 242 generates an identification, e.g., SCID, of a shortcut button to the multimedia streaming channel 1. Moreover, the processor 242 creates a link 258, e.g., a one-to-one correspondence, or a mapping, or an association, between the auto access ID1 and the identification SCID of the shortcut button to the multimedia streaming channel 1. For example, the processor 242 creates a pointer from a memory region, e.g., a memory cell, of the memory device 254 that will store the identification SCID to a memory region of the memory device 254 that will store the auto access ID1. The processor 242 further generates a symbol, such as a graphical symbol, an icon, a series of alphanumeric characters, text, a video symbol, or an animation, of the shortcut button identified with the identification SCID. The processor 242 sends the auto access ID1, the identification SCID, the link 258, and the symbol of the shortcut button via the internal communication device 290 and the wired or wireless connection to the communication device 252 of the smartphone 270.

In one embodiment, the generation of the identification SCID, the creation of the link 258, and the symbol of the shortcut button are performed by the processor 246 of the server system 110. For example, the processor 242 of the streaming interface 106 sends the auto access ID1 and the control data via the external communication device 244, the router 114, the computer network 108, and the external communication device 248 to the processor 246 of the server system 110. The processor 246 of the server system 110 generates the identification SCID, the link 258, and the symbol of the shortcut button and sends the identification SCID, the link 258, and the symbol of the shortcut button via the external communication device 248 and the computer network 108 or via the communication device 248, the computer network 108, and the router 114 to the processor 252 of the smartphone 270. The identification SCID facilitates addition of the shortcut button 290A to a multimedia application displayed on the smartphone 270. The multimedia application is identified by the multimedia application identifier 1.

The processor 252 of the smartphone 270 stores the identifications ID1 and the SCID within the memory device 254 of the smartphone 270. In addition, the processor 252 stores the link 258 in the memory device 254 of the smartphone 270. For example, the processor 252 of the smartphone 270 stores the pointer from a memory region, such as a memory cell, of the memory device 254 that stores the identification SCID to a memory region of the memory device 254 that stores the auto access ID1.

The external communication device 244 of the streaming interface 106, in one embodiment, is scheduled by the processor 242 of the streaming interface 106 to wait for the acknowledgment 3 before generating the auto access ID1. For example, the processor 242 of the streaming interface 106 does not generate the auto access ID1 until the acknowledgment 3 of the receipt of the identification IDp of the streaming multimedia channel 1 is received by the external communication device 244 of the streaming interface 106. The acknowledgment 3 is received when the processor 246 of the server system 110 determines that the identification IDp is authentic, e.g., matches a stored ID within the memory device 250 of the server system 110. In an embodiment, there is no need for the processor 242 of the streaming interface 106 to receive the acknowledgment 3 before the auto access ID1 is generated. The auto access ID1 identifies the series of processes, e.g., the control data, for execution by the streaming interface 106 when the shortcut button to the streaming multimedia channel 1 is selected via the smartphone 270.

In an embodiment, the memory device 250 stores a user account manager, which is a computer program, that is executed by the processor 246 to access a user profile from the memory device 250. In one embodiment, the user account manager is an integrated circuit that is located outside the memory device 250. For example, the user account manager assigns user accounts to different users. The user profile is of the user 1 and is stored in the user account 1. The user profile includes the auto access ID1 and other auto access IDs, such as an auto access ID2. In one embodiment, the user profile may include information about the user 1, such as a name of the user, a demographic of the user 1, or interests of the user 1. The auto access ID2 identifies a sequence of tasks, stored as control data, that are to be performed to access the streaming multimedia channel 2 using a shortcut in the same manner in which the auto access ID1 identifies the processes that are to be performed to access the streaming multimedia channel 1 using a shortcut. The auto access ID1 is sent from the processor 242 of the streaming interface 106 via the external communication device 244, the router 114, the computer network 108, and the external communication device 248 of the server system 110 to the processor 246 of the server system 110 for storage in the memory device 250. Moreover, the processes, e.g., the control data, that are identified by the auto access ID1 are sent from the processor 242 of the streaming interface 106 via the external communication device 244, the router 114, the computer network 108, and the external communication device 248 to the processor 246 of the server system 110 for storage in the memory device 250. Similarly, the auto access ID2 and the series of tasks that are identified by the auto access ID2 are sent from the processor 242 of the streaming interface 106 via the external communication device 244, the router 114, the computer network 108, and the external communication device 248 to the processor 246 of the server system 110 for storage in the memory device 250.

FIG. 2A-3 is a diagram of an embodiment of the smartphone 270 to illustrate a shortcut button 272A that is displayed on the display screen 274 of the smartphone 270. Upon receiving the symbol of the shortcut button from the processor 242 of the streaming interface 106, the processor 252 of the smartphone 270 displays the shortcut button 272A to the streaming multimedia channel 1 on the display device 274 of the smartphone 270. The shortcut button 272A has a form of the symbol. The shortcut button 272A is displayed within the multimedia application that is identification by the multimedia application identifier 1. Also, the shortcut button 272A is displayed after the user 1 logs into the user account 1 on the smartphone 270.

Figure 2B:
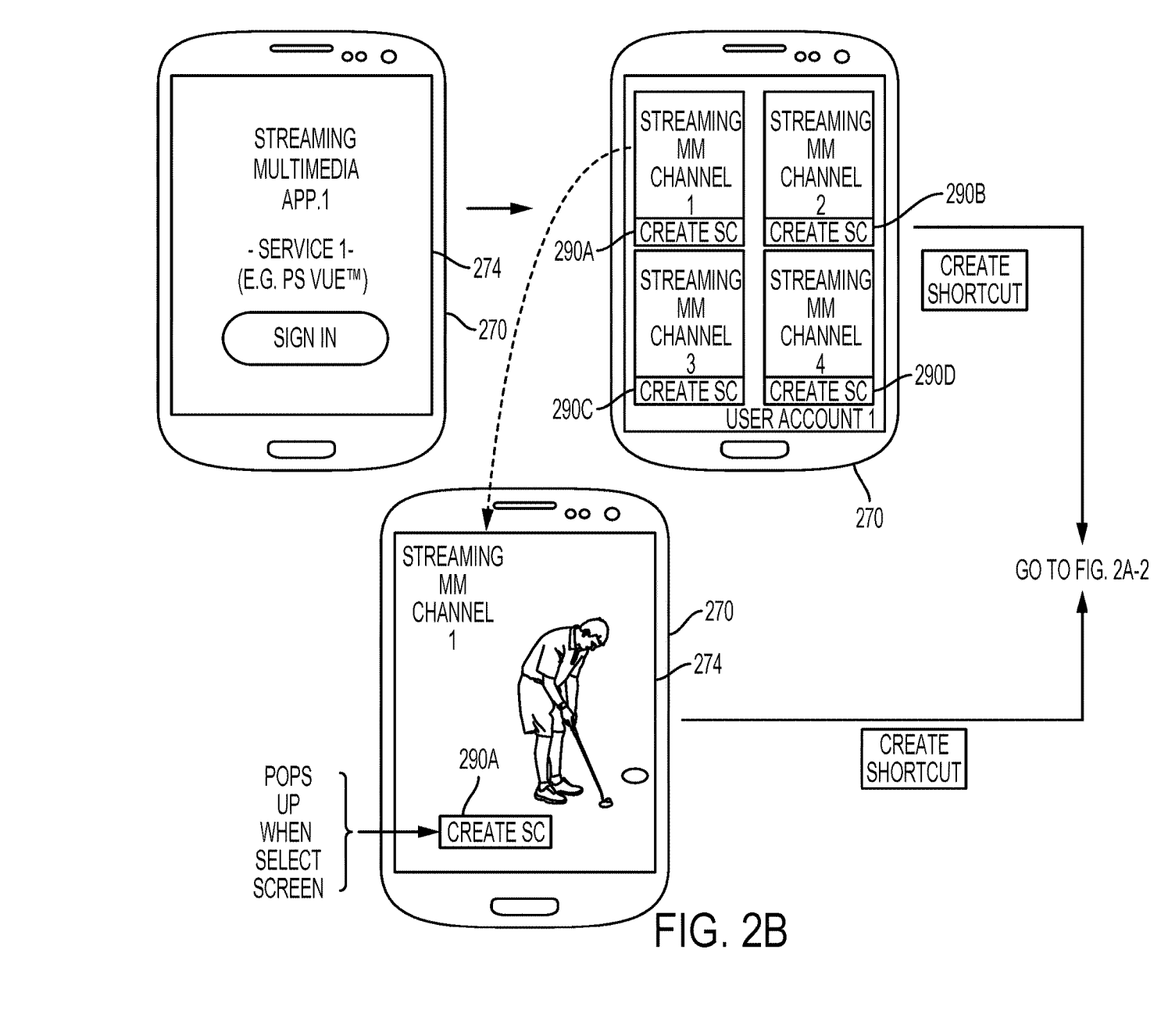
FIG. 2B is a diagram of an embodiment of the smartphone to illustrate a selection of a create shortcut button on the smartphone to generate the shortcut illustrated in FIG. 2A-3.
Figure 3:
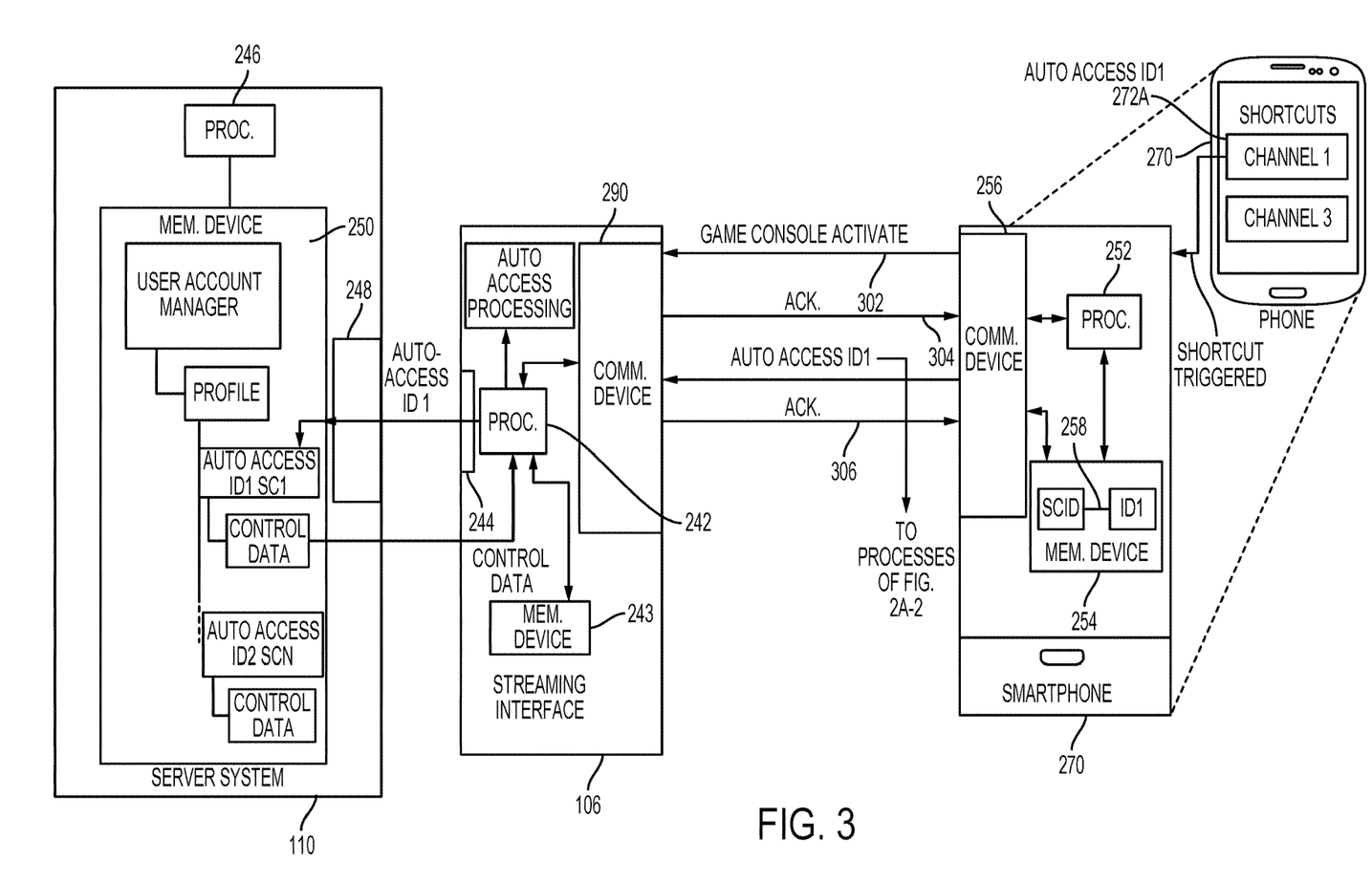
FIG. 3 is a diagram of an embodiment of a system to illustrate a repeat of the processes when a shortcut of FIG. 2A-3 on the display screen of the smartphone is selected by the user.

In an embodiment, the functions described herein with respect to FIG. 2A-3 apply equally to a tablet, or the device capable of coupling to the computer network 112. In one embodiment, a device capable of connecting to the computer network 112 has a network interface controller or a network interface card.

FIG. 2B is a diagram of an embodiment of the smartphone 270 to illustrate a selection of a create shortcut button on the smartphone 270 to generate the shortcut button 272A illustrated in FIG. 2A-3. The user 1 selects a sign in button displayed on the display device 274 and provides the user information on the display device 274, e.g., a touch screen. The smartphone 270 sends the user information via a communication device, e.g., a Wi-Fi communication device, of the smartphone 270, the router 114, and the computer network 108 to the streaming multimedia service 102 being executed on the server system 110 of FIG. 1B. In one embodiment, the smartphone 270 sends the user information via a communication device of the smartphone 270 that applies the external communication protocol and the computer network 108 to the streaming multimedia service 102 without sending the user information via the router 114.

Upon authenticating the user information, the processor 246 of the server system 110 sends, via the external communication device 248 of the server system 110, the identifications, e.g., identifiers, of the streaming multimedia channels 1 through 4 that the user account 1 has subscription to. The identifications of the streaming multimedia channels 1 through 4 are sent from the server system 110 to the smartphone 270 for display on the display device 274. In addition, the multimedia application identified by the streaming multimedia application 1 is executed to display the create shortcut button 290A and other create shortcut buttons 290B through 290D on the display device 274. For example, the display device 274 displays the streaming multimedia channel identifier 1 and further displays the create shortcut button 290A next to, such as adjacent to or within a pre-determined distance from, the streaming multimedia channel identifier 1. Similarly, the display device 274 displays the streaming multimedia channel identifier 2 and further displays the create shortcut button 290B next to the streaming multimedia channel identifier 2. Also, the display device 274 displays the streaming multimedia channel identifier 3 and further displays the create shortcut button 290C next to the streaming multimedia channel identifier 3. The display device 274 displays the streaming multimedia channel identifier 4 and further displays the create shortcut button 290D next to the streaming multimedia channel identifier 4. In addition, the display device 274 continues to display the identification of the user account 1 with the display of the identifications of the streaming multimedia channels 1 through 4 and the create shortcut buttons 290A through 290D.

The user 1 selects the streaming multimedia channel identifier 1 on the display device 274. An indication of the selection of the streaming multimedia channel identifier 1 is sent from the smartphone 270 via the computer network 112 or via the router 114 and the computer network 112 to the server system 110. In response to receiving the indication of the selection of the streaming multimedia channel identifier 1, the processor 246 of the server system 110 sends the video frames having the multimedia content for the streaming multimedia channel 1 via the computer network 112 or via the computer network 112 and the router 108 to the smartphone 270. The video frames are sent to display the streaming multimedia channel 1 on the display screen 274 of the smartphone 270.

The multimedia application identified by the multimedia application identifier 1 generates and displays the create shortcut button 290A at a time the streaming multimedia channel 1 is being displayed on the display screen 274. For example, the create shortcut button 290A is displayed on the display screen 274 when the user 1 touches the display screen 274 or hovers over the display screen 274 while the streaming multimedia channel 1 is being displayed on the display screen 274 of the smartphone 270. To illustrate, the processor 252 of the smartphone 270 determines, from image data captured from a camera of the smartphone 270 or from sensors integrated within the smartphone 270, whether the user 1 uses his/her hand to hover over or touch the display screen 274. Upon determining that the user 1 uses his/her hand to hover over or touch the display screen 274, the instruction to display the create shortcut button 290A is sent from the processor 252 of the smartphone 270 to the display device 274 to display the create shortcut button 290A with, such as adjacent to, or within a pre-determined distance from, or embedded within, the multimedia content of the streaming multimedia channel 1. In one embodiment, upon determining that the user 1 uses his/her hand to hover over or touch the display screen 274 of the smartphone 270, the multimedia application identified by the multimedia application identifier 1 determines to pause the display of the streaming multimedia channel 1 on the display screen 274 and to display the create shortcut button 290A on the display screen 274.

The user 1 selects the create shortcut button 290A that is displayed with the multimedia content of the streaming multimedia channel 1. An indication of the selection of the create shortcut button 290A is sent from the smartphone 270 via the wired or wireless connection to the streaming interface 106. For example, the smartphone 270 includes the internal communication device that applies the wireless internal communication protocol, for example, the Bluetooth™ protocol or Wi-Fi, to generate transfer units that are transferred via the wireless connection to the streaming interface 106.

With reference back to FIG. 2A-2, the processor 252 of the smartphone 270 sends the transfer units that indicate the selection of the create shortcut button 290A via the internal communication device 256 and the wireless connection to the internal communication device 290 of the streaming interface 106. Upon receiving the transfer units that indicate the selection of the create shortcut button 290A, the internal communication device 290 of the streaming interface 106 provides the indication of the selection of the create shortcut button 290A to the processor 242 of the streaming interface 106. In response to receiving the transfer units that indicate the selection of the create shortcut button 290A, the processor 242 generates the series of processes, such as the control data, and generates the auto access ID1 for storage in the memory device 246 of the streaming interface 106.

In an embodiment, the functions described herein with respect to FIG. 2B apply equally to a tablet, or the device capable of coupling to the computer network 112.

FIG. 3 is a diagram of an embodiment of a system 300 to illustrate a repeat of the processes when the shortcut button 272A of FIG. 2A-3 on the display screen 274 of the smartphone 270 is selected by the user 1. The system 300 includes the streaming interface 106, the smartphone 270, and the server system 110.

The user 1 selects the shortcut button 272A on the smartphone 270. Upon receiving an indication of the selection of the shortcut button 272A, the processor 252 of the smartphone 270 accesses the identification SCID of the shortcut button 272A, and identifies based on the link 258 the auto access ID1 of the processes to be executed by the streaming interface 106.

Upon receiving the indication of the selection of the shortcut button 272A, the processor 252 further determines whether the streaming interface 106 is active, e.g., awake, or is sleeping during a sleep mode. For example, the processor 252 sends a signal via the communication devices 256 and 290 to the processor 242 of the streaming interface 106 requesting a receipt of the signal. Upon determining that the receipt is not received from the processor 242 of the streaming interface 106 via the communication devices 290 and 256, the processor 252 of the smartphone 270 determines that the streaming interface 106 is sleeping. On the other hand, upon receiving the receipt of the signal from the processor 242 of the streaming interface 106 via the communication devices 256 and 290, the processor 252 of the smartphone 270 determines that the streaming interface 106 is active. In one embodiment, a sleep mode of a device is a mode of operation in which one or more components of the device are switched off, e.g., not receiving power, until needed.

When the processor 252 of the smartphone 270 determines that the streaming interface 106 is inactive, the processor 252 sends via the internal communication device 256, the wired or wireless connection, and the internal communication device 290, a signal 302 to the processor 242 of the streaming interface 106 to activate the streaming interface 106 from a sleep mode. The processor 242 of the streaming interface 106 upon being activated, e.g., receiving power from a power supply of the streaming interface 106 or from an electrical utility power line, sends an acknowledgment signal 304 via the internal communication device 290 and the internal communication device 256 to the processor 252 of the smartphone 270.

Upon receiving the acknowledgment signal 304, the processor 252 of the smartphone 270 accesses the auto access ID1 of the processes, and sends the auto access ID1 via the internal communication device 256 and the internal communication device 290 to the processor 242 of the streaming interface 106. In one embodiment, the processor 252 of the smartphone 270 does not wait to receive the acknowledgment signal 304 before sending the auto access ID1.

The processor 242 of the streaming interface 106 accesses the control data from the memory device 250 of the streaming interface 106 based on a match between the received auto access ID1 from the smartphone 270 and the auto access ID1 stored in the memory device 250, and executes the processes described above with reference to FIG. 2A-2 in response to receiving the auto access ID1 of the processes.

Moreover, the processor 242 of the streaming interface 106 sends an acknowledgment 306 of receipt of the auto access ID1 via the communication devices 290 and 256 to the processor 252 of the smartphone 270. In one embodiment, the processor 242 of the streaming interface 106 does not send the acknowledgment 306. When the processes are executed, the streaming multimedia channel 1 is displayed on the display device 112 or on the smartphone 270 at a later point in time compared to a time at which the streaming multimedia channel 1 was displayed before, such as at a time of generation of the create shortcut button 290A. In one embodiment, the processor 242 of the streaming interface 106 performs the processes described above with reference to FIG. 2A-2 and having the auto access ID1 after sending the acknowledgment 306 to the processor 252 of the smartphone 270.

In one embodiment, upon receiving an indication of the selection of the shortcut button 272A, the processor 252 of the smartphone 270 determines whether the display device 112 is turned on, e.g., is powered or is receiving power from the electrical utility power line via a switch. For example, the processor 252 of the smartphone 270 sends a signal to the display device 112 requesting a receipt of the signal. Upon determining that the receipt is not received from the display device 112, the processor 252 of the smartphone 270 determines that the display device 112 is not turned on or is turned off. On the other hand, upon receiving the receipt of the signal from the display device 112, the processor 252 determines that the display device 112 is turned on. Upon determining that the display device 112 is not turned on, the processor 252 of the smartphone 270 sends a signal to the display device to turn on the display device 112. For example, the processor 252 of the smartphone 270 sends a signal to turn on the switch within the display device 112 to power the display device 112. The activation of the streaming interface 106 is performed after turning on the display device 112. In an embodiment, the turning on of the display device is performed after the activation of the streaming interface 106 but before sending the auto access ID1 to the streaming interface 106.

In an embodiment, the series of processes, such as the control data, and/or the auto access ID1 are not stored within the streaming interface 106. In this embodiment, the auto access ID1 and the control data is stored in the server system 110. The processor 242 of the streaming interface 106 sends the auto access ID1 received from the smartphone 270 to the external communication device 244 of the streaming interface 106. The auto access ID1 is received by the streaming interface 106 when the shortcut button 272A is selected by the user 1. The processor 242 of the streaming interface 106 determines whether the auto access ID1 received from the smartphone 270 matches any auto access ID stored in the memory device 243 of the streaming interface 106. The processor 242 has not previously stored the auto ID1 and the control data in the memory device 243 at the time the processor 242 creates the auto access ID1. Upon determining that the auto access ID1 does not match any auto access ID stored in the memory device 243, the processor 242 sends the auto access ID1 received from the smartphone 270 via the external communication device 244, the router 114, the computer network 108, and the external communication device 248 of the server system 110 to the processor 246 of the server system 110. Upon receiving the auto access ID1, the processor 246 of the server system 110 identifies the control data corresponding to the auto access ID1, accesses the control data from the memory device 250 of the server system 110, and sends the control data via the external communication device 248, the external communication device 248, the computer network 108, the router 114, and the external communication device 244 to the processor 242 of the streaming interface 106. The processor 242 of the streaming interface 106 receives the control data and executes the series of processes within the control data in a manner described above.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a computer selectively activated or configured by a computer program stored in the computer. In particular, in one embodiment, various machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a multimedia streaming environment, in some embodiments, instead of a multimedia streaming, other environments, e.g., a gaming environment or a video conferencing environment, is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
receiving, by a streaming interface, a request from an application of a portable device to generate a shortcut icon to a media channel that is currently being rendered on a main display, the request is associated with a user account, the media channel being one of a plurality of media channels provided by a streaming multimedia service;
identifying, by the streaming interface, the media channel currently being rendered and user login data used to access the user account;
generating, by the streaming interface, control data for the shortcut icon, the shortcut icon usable to instruct the streaming interface for logging into the user account and returning to the media channel at a later point in time;
sending data for the shortcut icon, by the streaming interface, to the application of the portable device;
receiving a selection of the shortcut icon from the portable device;
in response to said receiving the selection of the shortcut icon, enabling an automatic log in into the user account to provide access to the user account and launching via the streaming interface the media channel again, wherein the automatic log in into the user account is enabled without user re-entry of the user login data for enabling the logging into the user account.

2. The method of claim 1, wherein the control data includes a plurality of operations to be executed to perform the launch of the media channel, timing of the execution of the operations, and an order of the execution of the operations.

3. The method of claim 1, wherein the control data includes a plurality of instructions for:
sending the user login data from the streaming interface to the streaming multimedia service,
receiving a confirmation that the user login data is authentic,
sending an identification of the streaming multimedia service from the streaming interface to the streaming multimedia service, wherein said sending the identification of the streaming multimedia service is performed after said sending the user login data,
receiving a confirmation that the identification of the streaming multimedia service is accurate,
sending an identification of the media channel from the streaming interface to the streaming multimedia service, wherein said sending the identification of the media channel is performed after said sending the identification of the streaming multimedia service, and
receiving a confirmation that the identification of the media channel is accurate.

4. The method of claim 3, wherein the instructions are for sending a signal to the main display to turn on the main display, wherein said sending the signal to the main display is performed before said sending the user login data.

5. The method of claim 3, wherein the instructions are for sending a signal to activate the streaming interface, wherein said sending the signal to activate the streaming interface is performed after said sending the signal to the main display and before said sending the user login data.

6. The method of claim 3, further comprising:
receiving an auto access ID associated with the shortcut icon from the portable device when the shortcut icon is selected on the portable device; and
performing said sending the user login data, said sending the identification of the streaming multimedia service, and said sending the identification of the media channel in response to receiving the auto access ID.

7. A method for applying a shortcut to a streaming media channel, comprising:
receiving, by a streaming multimedia service, user login data of a user account from a portable device;
receiving, by the streaming multimedia service, a selection of a multimedia application from the portable device via the user account;
providing, by the streaming multimedia service, access to a plurality of streaming multimedia channels via the user account upon determining that the user login data is authentic and upon receiving the selection of the multimedia application;
receiving, by a streaming interface, via the user account a selection indicating that a shortcut icon to one of the streaming multimedia channels is to be created;
creating, by the streaming interface, the shortcut icon upon receiving the selection;
receiving, by the streaming interface, a selection of the shortcut icon; and
in response to said receiving the selection of the shortcut icon, enabling, by the streaming interface, log in and access to the user account and to the one of the streaming multimedia channels, wherein the log in and access to the user account is enabled without user re-entry of the user login data for enabling the access to the user account.

8. The method of claim 7, wherein in response to said receiving the selection indicating that the shortcut icon is to be created, generating, by the streaming interface, control data having a plurality of processes including:
sending the user login data from the streaming interface to the streaming multimedia service,
receiving a confirmation from the streaming multimedia service that the user login data is authentic,
sending an identification of the multimedia application from the streaming interface to the streaming multimedia service,
receiving a confirmation from the streaming multimedia service that the identification of the multimedia application is accurate,
sending an identification of the one of the streaming multimedia channels from the streaming interface to the streaming multimedia service,
receiving a confirmation from the streaming multimedia service that the identification of the one of the streaming multimedia channels is accurate,
receiving multimedia content of the one of the streaming multimedia channels upon sending the identification of the one of the streaming multimedia channels,
associating, by the streaming interface, an auto access identifier of the processes with said sending the user login data from the streaming interface, said sending the identification of the multimedia application, said sending the identification of the one of the streaming channels from the streaming interface to the streaming multimedia service, and said receiving the multimedia content of the one of the streaming multimedia channels, and
sending the auto access identifier from the streaming interface to the portable device for storage within the portable device.

9. The method of claim 8, wherein said creating the shortcut icon includes linking, by the streaming interface, the auto access identifier that is stored with an identity of the shortcut icon.

10. The method of claim 9, wherein in response to receiving the selection of the shortcut icon,
sending a signal from the portable device to the streaming interface to activate the streaming interface,
receiving, by the portable device, an acknowledgment from the streaming interface of the activation,
sending the auto access identifier of processes from the portable device to the streaming interface, and
receiving, by the portable device, an acknowledgment of receipt of the auto access identifier from the streaming interface.

11. The method of claim 10, wherein in response to receiving, by the streaming interface, the auto access identifier of processes from the portable device, performing the processes to enable the access to the one of the streaming multimedia channels.

12. The method of claim 7, wherein the streaming multimedia service is a streaming television network service.

13. The method of claim 7, wherein the shortcut icon is displayed on the portable device.

14. A system comprising:
a streaming interface configured to connect to a computer network to access a streaming multimedia service;
a portable device coupled to the streaming interface; and
a server coupled to the streaming interface via the computer network, the server configured to execute the streaming multimedia service to:
receive user login data of a user account from the portable device;
receive a selection of a multimedia application via the user account from the portable device;
provide access to a plurality of streaming multimedia channels via the user account upon determining that the user login data is authentic and upon receiving the selection of the multimedia application,
wherein the streaming interface is configured to receive via the user account a selection indicating that a shortcut icon to one of the streaming multimedia channels is to be created,
wherein the streaming interface is configured to:
receive a selection of the shortcut icon; and
in response to said receiving the selection of the shortcut icon, enable log in and access to the user account and to the one of the streaming multimedia channels, wherein the log in and access to the user account is enabled without user re-entry of the user login data for enabling the access to the user account.

15. The system of claim 14, wherein in response to the receipt of the selection indicating that the shortcut icon is to be created, the streaming interface is configured to:
generate control data having a plurality of instructions configured to:
send the user login data to the streaming multimedia service,
receive a confirmation from the streaming multimedia service that the user login data is authentic, send an identification of the multimedia application to the streaming multimedia service, receive a confirmation from the streaming multimedia service that the identification of the multimedia application is accurate, send an identification of the one of the streaming multimedia channels to the streaming multimedia service, receive a confirmation from the streaming multimedia service that the identification of the one of the streaming multimedia channels is accurate, receive multimedia content of the one of the streaming multimedia channels, associate an auto access identifier of processes with the plurality of instructions, and send the auto access identifier to the portable device for storage within the portable device.

16. The system of claim 15, wherein the streaming interface is configured to link the auto access identifier with an identity of the shortcut icon.

17. The system of claim 16, wherein in response to the receipt of the selection of the shortcut icon, the portable device is configured to:

send a signal to the streaming interface to activate the streaming interface, receive an acknowledgment from the streaming interface of the activation, send the auto access identifier of processes to the streaming interface, and receive an acknowledgment of receipt of the auto access identifier from the streaming interface.

18. The system of claim 17, wherein in addition to sending the acknowledgment of the receipt of the auto access identifier to the portable device, the streaming interface is configured to execute the instructions to enable the access to the one of the streaming multimedia channels.

19. The system of claim 14, wherein the streaming multimedia service is a streaming television network service.

20. The system of claim 14, wherein the shortcut icon is displayed on the portable device.

21. The method of claim 1, wherein the media channel is launched again to access content of the media channel from a point in time at which the shortcut icon for the launch of the media channel is created.

22. The method of claim 1, wherein the media channel is launched again to access content of the media channel that is provided by the streaming multimedia service, wherein the content provided by the streaming multimedia service is different from content provided by the streaming multimedia service at a time at which the shortcut icon for the launch of the media channel is created.

23. The method of claim 1, wherein the shortcut icon is displayed on the portable device, the main display is of a television, and the streaming interface is a game console.

* * * * *